Figure 1:
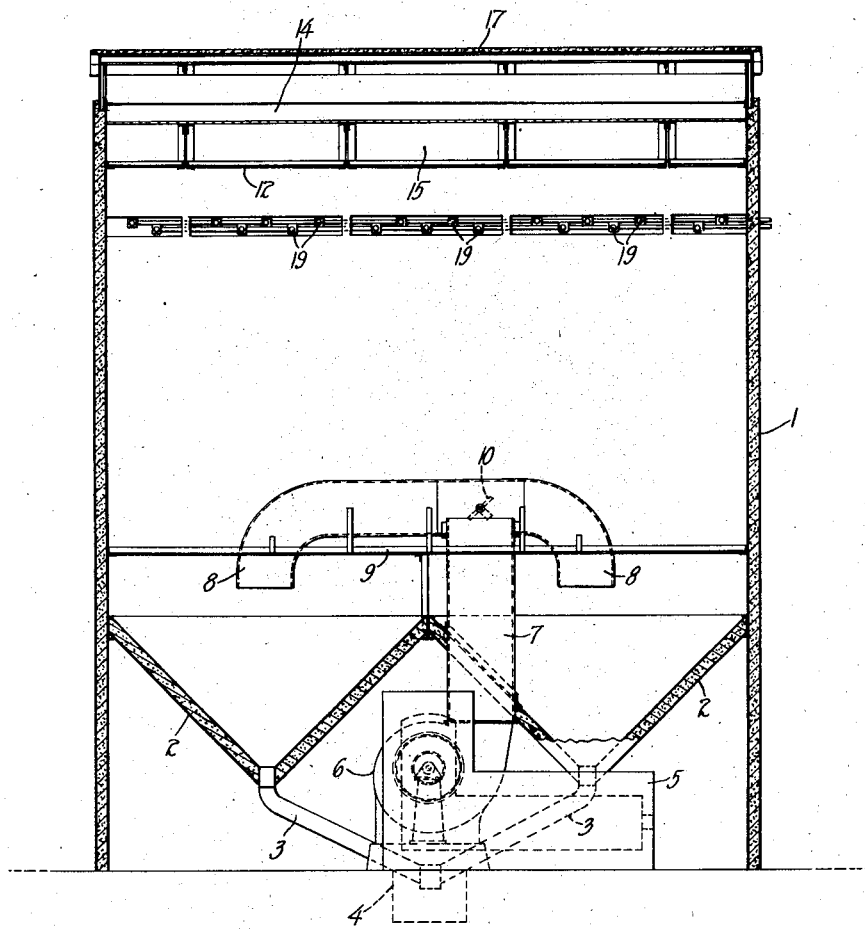

Nov. 17, 1925.   1,561,971
J. G. COFFIN ET AL
METHOD FOR TREATING PULVERULENT MATERIAL AND PRODUCT
Filed Oct. 16, 1923   2 Sheets-Sheet 2

Inventors
JOSEPH G. COFFIN &
ALEXIS W. KEEN
By their Attorney

Patented Nov. 17, 1925.

1,561,971

UNITED STATES PATENT OFFICE.

JOSEPH G. COFFIN, OF HEMPSTEAD, AND ALEXIS W. KEEN, OF NEW YORK, N. Y., ASSIGNORS TO THE NAUGATUCK CHEMICAL COMPANY, OF NAUGATUCK, CONNECTICUT, A CORPORATION OF CONNECTICUT.

METHOD FOR TREATING PULVERULENT MATERIAL AND PRODUCT.

Application filed October 16, 1923. Serial No. 668,957.

*To all whom it may concern:*

Be it known that we, JOSEPH G. COFFIN and ALEXIS W. KEEN, both citizens of the United States, and residing at Hempstead, Long Island, in the county of Nassau and State of New York, and New York city, county of New York, and State of New York, respectively, have invented a certain new and useful Method for Treating Pulverulent Material and Product, of which the following is a full, clear, and exact description.

This invention relates to a method for treating pulverulent material and to the product thereof, and more particularly to a method for directly drying clay in suitable form, and to the product.

In addition to its extensive use for pottery and various other purposes in the arts, clay has more recently been extensively used as a filler for rubber compounds. When used for such purpose the clay must be free from grit and moisture and in such form that it can be readily incorporated with the rubber mix on a mill. By the method at present in use the clay after first being mixed with water to form a so-called "slip", is treated to remove grit and large particles and some of the water, and it is then conveyed to a filter press in order to remove the bulk of the remaining water. From the filter press the wet clay is taken to drying racks on which it is disposed in lumps and subjected to heat. The dried lump clay is then stored or shipped to the place where it is to be further treated or used. Before the lump clay can be used for many purposes, such as for instance in a rubber mix, it must be subjected to a second drying operation and then pulverized on a mill, after which the powdered clay is placed in storage or conveyed to the place where it is to be used. The above operations require a considerable expenditure of time, labor, space and apparatus, and there is an objectionable dusting in handling the dried material.

An object of our invention is to provide a rapid and economical method for drying pulverulent material such as clay.

Another object is to provide a method for directly drying clay and similar material in subdivided form.

A further object is to provide a relatively fluent dry pulverulent material, and A still further object is to provide a dry clay or similar material in a fine granular form.

The method comprises broadly treating a pulverulent material such as clay in fluid suspension to remove large particles therefrom and subsequently to reduce its fluid content, and then finely dividing the treated suspension to form it into small globular masses which are then dried in the form of small globules of lightly cohering particles of the material while in suspension in a gaseous drying medium. The invention also consists in the product of the method and apparatus.

For a detailed disclosure of the invention reference is had to the accompanying specification and drawings illustrating one form of apparatus for carrying out the invention, in which drawings:—

Figure 2:
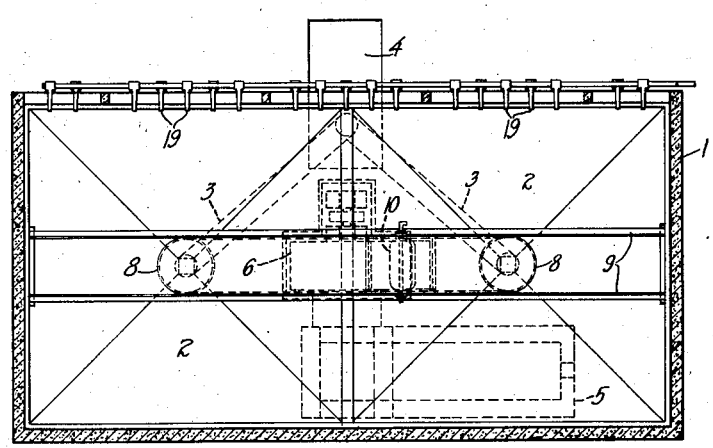
Figure 3:
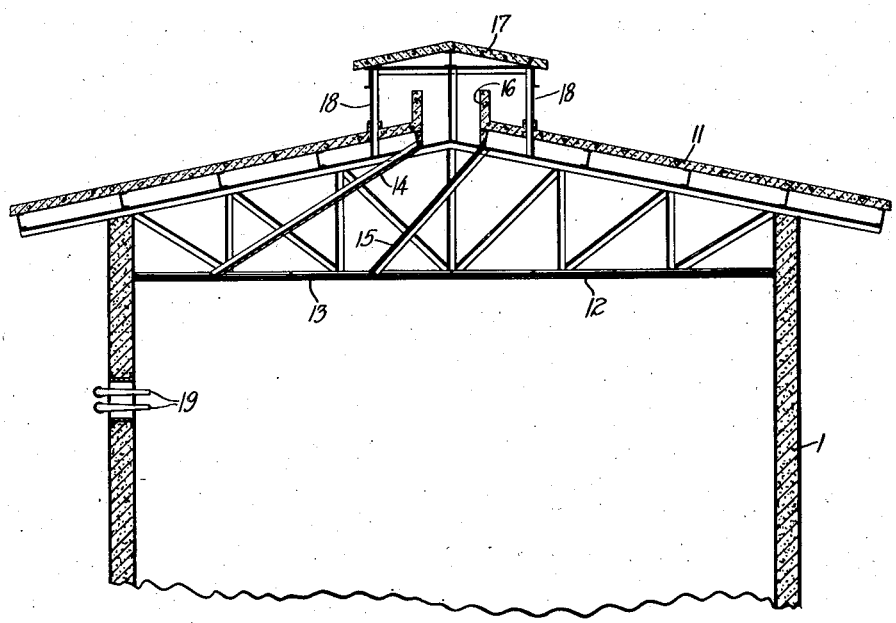

Figure 1 is a part central longitudinal section through the apparatus for carrying out the method, Figure 2 is a horizontal section thereof, and Figure 3 is an enlarged transverse section of the upper part of the apparatus taken at right angles to that in Figure 1.

The method will first be described in its application to the treatment of clay, but it is suitable for the preparation of any other pulverulent material in a conveniently handled and desirable form.

In carrying out the invention the clay, if not already in the form of a "slip" through hydraulic mining, is mixed with water to form a suspension, and the larger particles such as grit, pebbles, etc., removed by settling. The "slip" is then allowed to further settle to remove a part of the water, and the thickened but still fluid clay is pumped to the drying apparatus shown in Figs. 1 to 3. This apparatus in the present instance consists of a heat insulated casing 1 forming a drying chamber. The casing as shown consists of inner and outer sheet metal walls having any suitable insulating material disposed between, but any other desirable construction may be used such as concrete or hollow tile. The bottom as shown preferably consists of hoppers 2 in the form of inverted pyramids, the number of which will be varied in accordance with the size of the drying chamber. The slant of the hopper bottoms is made sufficient to allow of the ready discharge of the dried material, which then flows through the pipes 3 to a collecting receptacle 4.

Any suitable drying medium may be used in the drying chamber, but in the present instance that used is a mixture of air and combustion products supplied by the furnace 5. The furnace is preferably of the general type shown in the patent to Bradley and Coffin, No. 1,466,443, Aug. 28, 1923, except that the air mixing chamber is disposed transversely on top of the combustion chamber instead of at the side thereof, but any other suitable form of furnace may be used. The mixed combustion products and air are withdrawn from the furnace by the fan 6 and conveyed through the upright pipe 7 to the downwardly turned nozzles 8, which latter are preferably disposed centrally above the hoppers 2. The nozzles 8 may be rigidly held in position by any suitable means such as the angle irons 9. In order to properly regulate the flow of the drying medium to the nozzles 8 a small deflecting damper 10 is provided.

At its top the casing 1 is provided with a roof 11, below which is disposed a ceiling 12 forming the top of the drying chamber. Adjacent one side of the chamber the ceiling is provided with an elongated exhaust opening 13, preferably extending the entire length of the chamber, which communicates with an inclined passage-way formed by the walls 14 and 15, this passage-way discharging at its upper end through an opening 16 in the roof within the space below a monitor 17, from which space the exhaust products escape into the atmosphere through the openings 18. If desired the ceiling 12 and inclined passage-way may be omitted, in which case the exhaust opening will be formed in the roof and open directly into the monitor 17, but this exhaust opening will of course be disposed in about the same relative position with respect to the spray nozzles as previously. Adjacent the top of the drying chamber and on the same side as the exhaust opening 13 a plurality of spray nozzles 19 are disposed in horizontal series, the number and arrangement of which nozzles may be varied to suit conditions.

In carrying out the method the clay, which has been purified and partly freed of water as before described, is supplied to the nozzles 19 and sprayed transversely into the drying chamber. The globular sprayed particles in their descent come in contact with the ascending current of the drying medium discharged from the nozzles 8 and the dried material deposits as very small globular masses or pellets on the sides of the hoppers 2, while the exhaust drying medium escapes through the opening 13 and thence to the outer air. It will be seen that the exhaust opening, which extends the entire length of the drying chamber, is disposed on the same side of the latter as the spray nozzles 19, hence the drying medium is compelled to pass through the spray discharged by the nozzles 19 before it can escape, and all light dried or partially dried material that might otherwise escape with the exhaust is retained by the wet spray. By reason of the arrangement of the nozzles 8 the drying medium is discharged downwardly into the hoppers 2 and then sweeps upwardly along the walls of the hoppers and into the main body of the drying chamber. The drying medium is introduced at a rather high temperature, about 500° to 700° F. for instance, and as a result of the described construction contacts while at its highest temperature with the clay globules rolling down the hopper bottoms or about to deposit thereon, thereby producing a very thoroughly dried product. The dried clay as before stated deposits in the hoppers in the form of very small friable globular masses or pellets, each of which is an aggregate of lightly cohering particles of clay, and the product very much resembles a fine sand in its appearance to the naked eye. Hence it does not tend to compact when in bulk but will flow very readily, and therefore, easily rolls to the bottoms of the hoppers 2 and through the discharge pipes 3 to the receptacle 4. The material may be conveyed by any suitable means from the receptacle 4 to a bagging apparatus or disposed for storage in any suitable manner. Due to the rounded granular form in which the clay is obtained and the absence of any sharp particles it is extremely fluent and, therefore, can be very readily handled as compared with the compact mass formed when clay is in a pulverized state. This property of fluency is so marked that if desired the hopper bottoms 2 may be omitted and a flat bottom substituted, the latter being provided with openings radially below the nozzles 8. The dried material will then accumulate in the form of mounds with slopes having a relatively small angle of repose, the succeeding material then rolling down the slopes and into the openings. In other words the accumulated dried material itself will take the place of the hopper bottoms 2. However, the hopper bottom is preferred, as there is then no accumulation of the dried material in the drying chamber, which might be objectionable under certain circumstances. As before stated, the dried grains or pellets are very small and the individual particles of clay forming them are only lightly held together, so that a very slight pressure such as that of the fingers is sufficient to crush the grains, but the bond between the particles is sufficiently strong to substantially prevent their breaking up during handling. Hence the product is entirely suitable as obtained from the drying chamber for use directly in the rubber mill. Due to its form the objectionable dusting which occurs in the mixing and handling of finely powdered materials is also avoided.

It will be seen that by our invention clay is directly obtained in a dry friable form suitable for use in a rubber mill or for any other purpose with a minimum expenditure of time, labor, space and apparatus, and in particular the filtering step, one drying step, and the pulverizing step of the previously known method have been eliminated, as well as the necessary apparatus for carrying them out.

The invention is widely applicable for efficiently drying any pulverulent material, such as other rubber fillers, which is desirably ground wet in a fluid in which it is insoluble, or in which objectionable dusting occurs in handling. Examples of materials for which our invention may be used are, whiting, barytes and lithopone. The invention is also applicable where a mixture of finely divided materials is required; for example in the pottery art when several clays are to be combined they may be mixed in fluid suspension and then dried by our method.

While a specific embodiment of the invention has been shown and described it is obvious that numerous modifications may be made therein in view of the disclosure, and it is not desired to limit the invention otherwise than as set forth in the appended claims.

Having thus described our invention, what we claim and desire to protect by Letters Patent is:

1. The method of treating clay which comprises forming a fluid suspension thereof, projecting the suspended clay in finely divided form into a heated drying medium, and drying while in suspension in the form of minute globular masses composed of lightly cohering particles of clay.

2. The method of treating clay which comprises forming a slip thereof, partially removing water from the clay to form a thickened but fluid suspension, spraying the thickened clay into a heated drying medium, and drying while in suspension into the form of very small globular friable masses of lightly cohering particles of clay.

3. The method of treating clay which comprises forming a slip thereof, partially removing water from the clay by settling to form a thickened but fluid suspension, spraying the thickened clay into a moving counter current of a highly heated drying medium, and drying while in suspension into the form of very small globular masses of lightly cohering particles of clay.

4. The method of treating pulverulent material which comprises forming a suspension thereof in a fluid in which it is insoluble, sub-dividing said suspension into very small globules, and drying in the form of very small globular friable masses composed of lightly cohering particles of the material while in suspension in a heated gaseous drying medium.

5. The method of treating pulverulent insoluble inorganic materials, which comprises forming a fluid suspension of the material, subdividing the same into small globules, and drying in the form of very small substantially globular masses of lightly cohering particles of the material while in suspension in a highly heated gaseous medium, said medium being first applied to the most nearly dried globules.

6. The method of treating pulverulent insoluble inorganic materials, which comprises forming a fluid suspension of the material, spraying said suspension into the form of small globules, and drying the globules to the form of very small substantially globular masses of lightly cohering particles of the material by passing a highly heated current of a drying medium through the spray, said current first mingling while at its highest temperature with the dryest portion of the spray and leaving the spray at the wettest portion of the latter.

7. The method of treating pulverulent water insoluble inorganic material which comprises forming a thick water suspension of the material, sub-dividing said suspension into the form of small globules, and drying said globules into the form of very small substantially globular friable masses composed of light cohering particles of the material while in suspension in a highly heated gaseous medium, said gaseous medium being first directed against the most nearly dried material and then in a direction generally counter to the direction of movement of the suspended globules.

8. As a new article of manufacture, dried clay in the form of very small approximately spherical friable pellets.

9. As a new article of manufacture, a fluent dried clay in the form of very small rounded individually dried friable pellets.

10. As a new article of manufacture, dried pulverulent material in the form of very small individually dried friable globular masses composed of lightly cohering particles of the material.

11. A fluent dried pulverulent inorganic material derived from a fluid suspension of the material by spray drying and composed of very small friable substantially globular masses of the material.

Signed at New York, in the county and State of New York, this 10th day of October, 1923.

JOSEPH G. COFFIN.
ALEXIS W. KEEN.